Dec. 25, 1928.   H. J. LANGE   1,696,206
WATER HEATER
Filed Sept. 30, 1927   4 Sheets-Sheet 2

Henry J. Lange, INVENTOR,
BY
Siggers & Adams,
ATTORNEYS

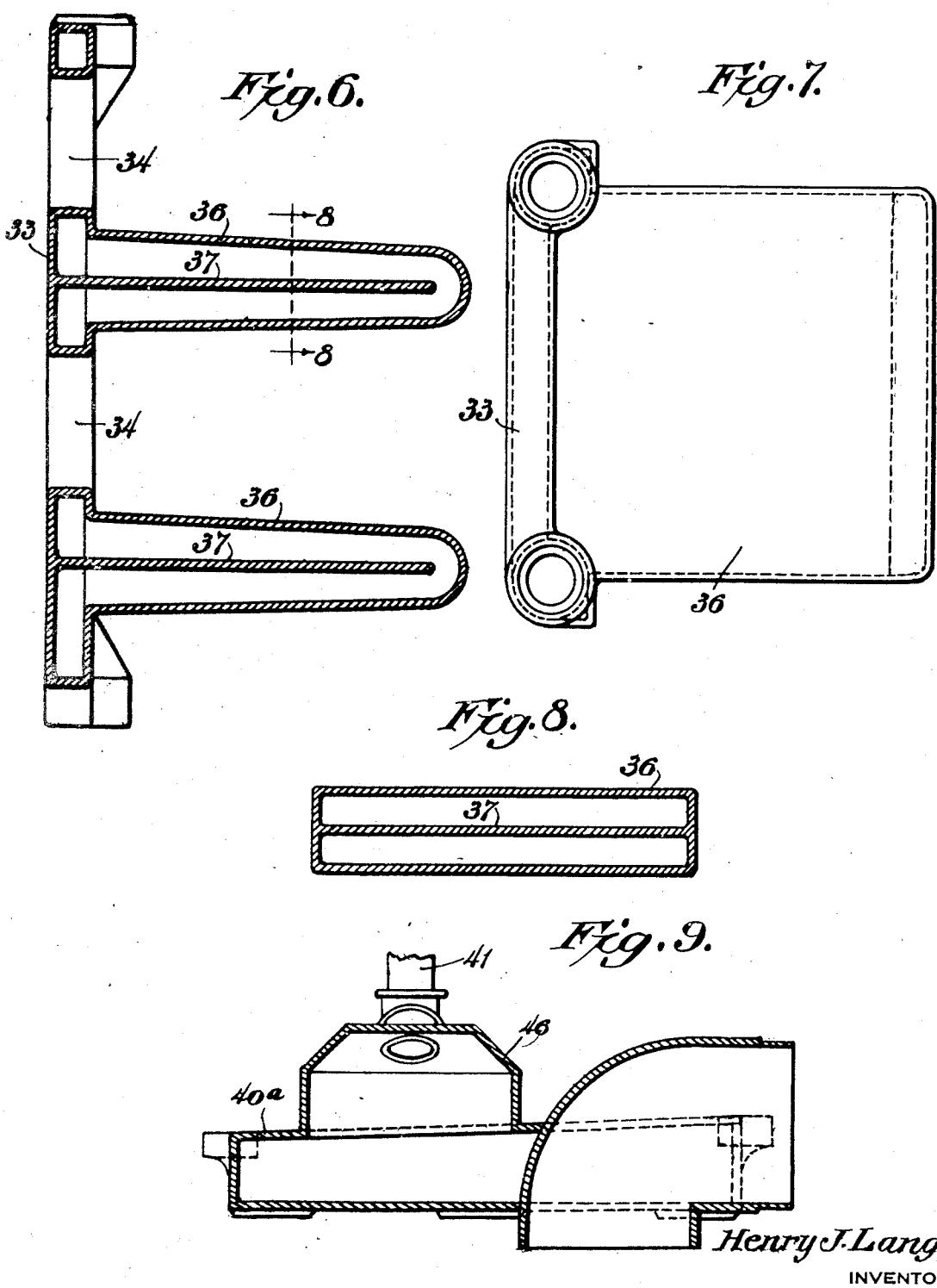

Dec. 25, 1928.
H. J. LANGE
WATER HEATER
Filed Sept. 30, 1927    4 Sheets-Sheet 4
1,696,206
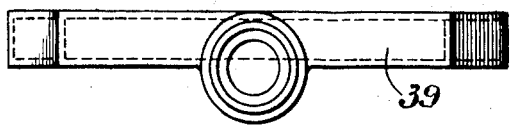
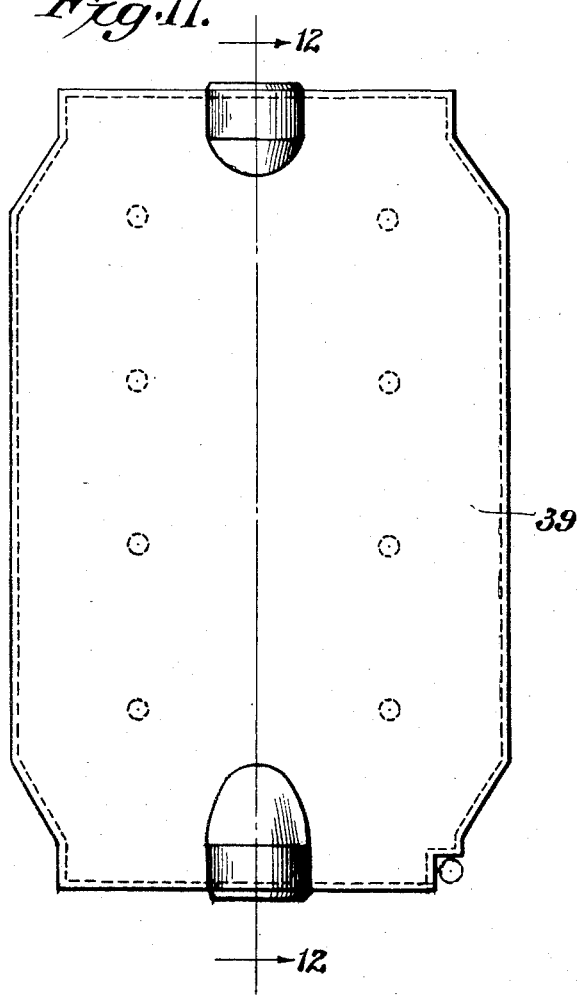
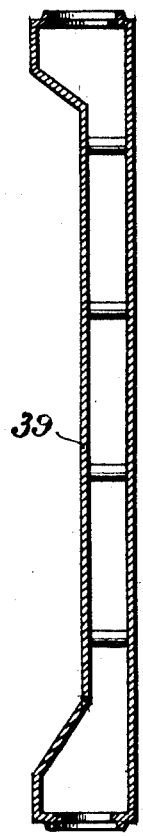
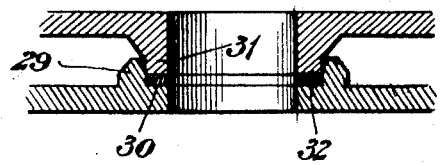
Henry J. Lange,
INVENTOR,
BY
ATTORNEYS Patented Dec. 25, 1928.

1,696,206

UNITED STATES PATENT OFFICE.

HENRY J. LANGE, OF LORAIN, OHIO.

WATER HEATER.

Application filed September 30, 1927. Serial No. 223,181.

This invention relates to water heating furnaces such as are used for domestic heating plants and aims, among other objects, to provide an improved heater which can be manufactured very cheaply, is easy to install and is very efficient in operation. Other advantages will appear in the specification taken in connection with the accompanying drawings wherein Fig. 1 is a central, vertical, sectional view of a heater embodying the improvements;

Fig. 4 is a fragmentary rear elevation of the water fire box of the heater shown in Fig. 1;

Fig. 6 is a central sectional view of the front wall of the heater;

Fig. 7 is a top plan view of the front wall;

Fig. 8 is a sectional view taken on the line 8—8 of Fig. 6;

Fig. 9 is a central sectional view of a slightly modified form of dome capable of use with the heater;

Fig. 10 is a top plan or end view of one of the side water walls of the heater;

Fig. 11 is a side elevation of the side water wall;

Fig. 12 is a sectional view taken on the line 12—12 of Fig. 11; and

Fig. 13 is a fragmentary sectional view showing one of the joints between the sections of the heater being taken on the line 13—13 in Fig. 1.

Figure 1:
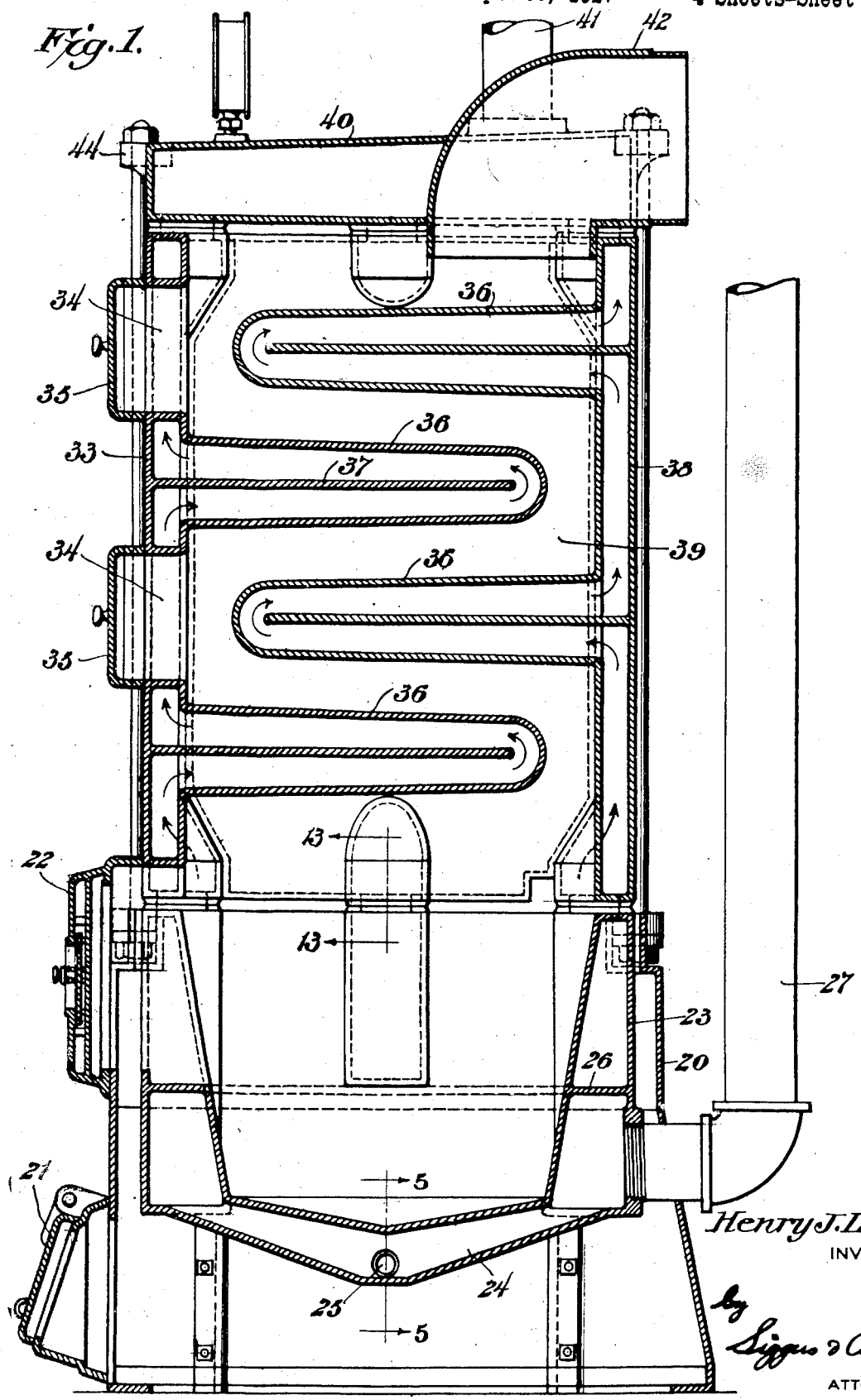
Figure 2:
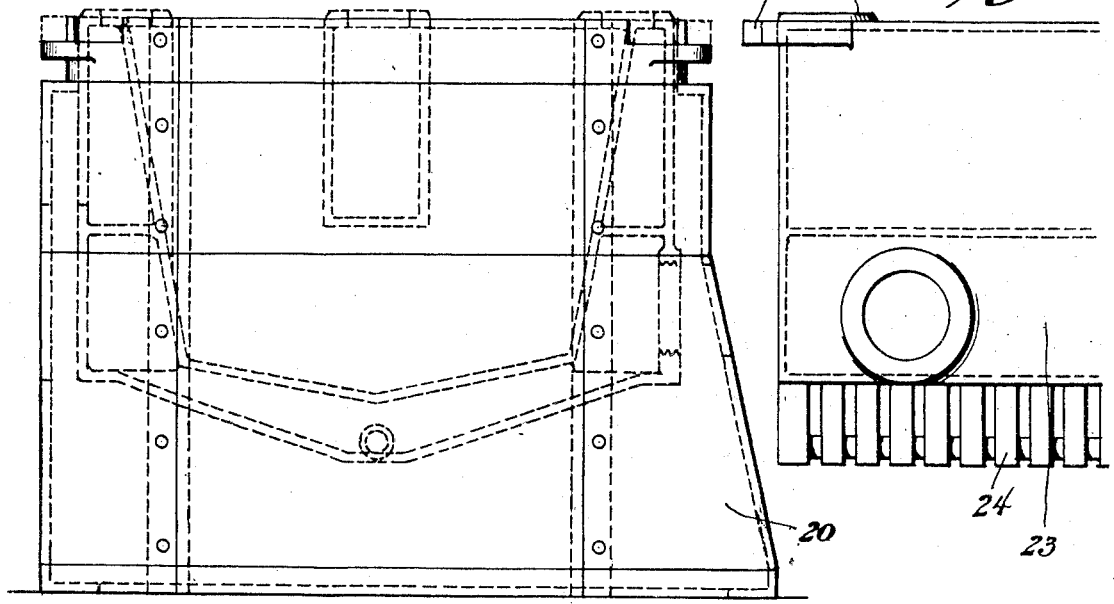
Fig. 2 is a side elevation of the base portion of the heater shown in Fig. 1.
Figure 3:
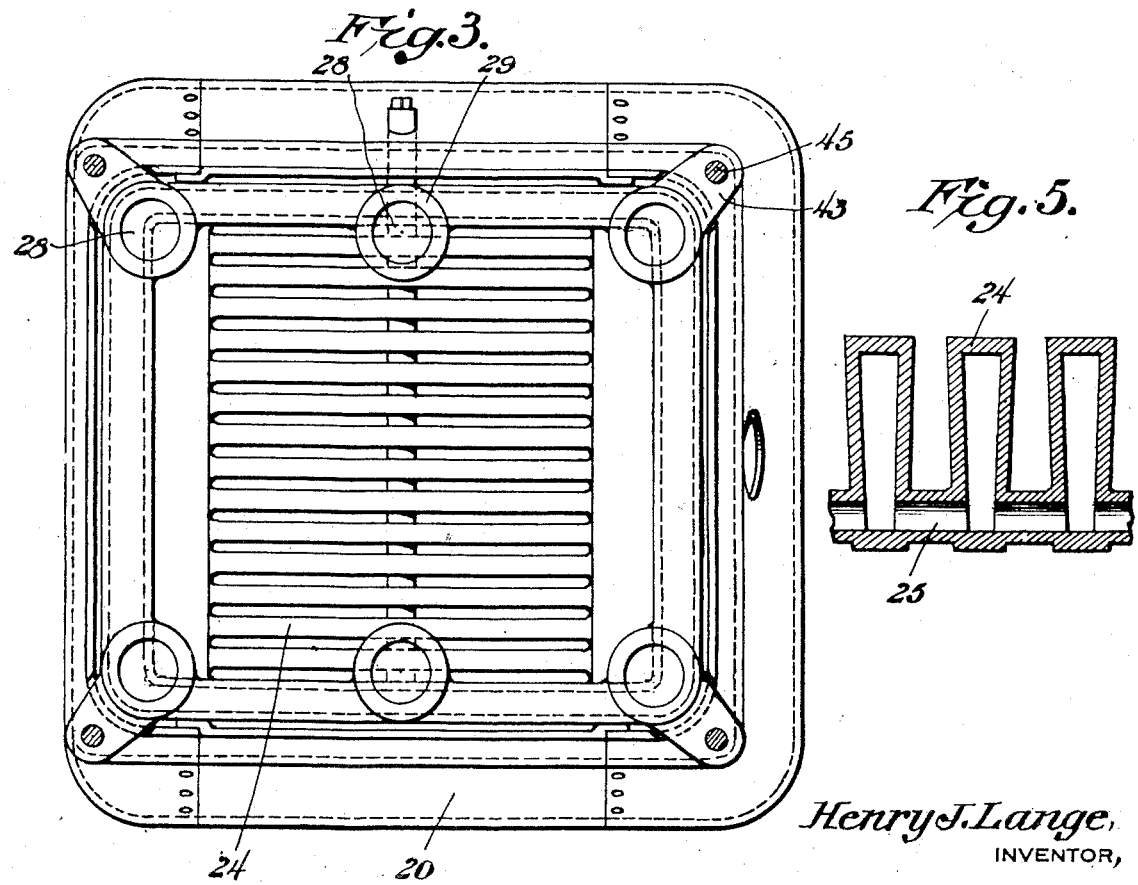
Fig. 3 is a top plan view of the base portion.
Figure 5:
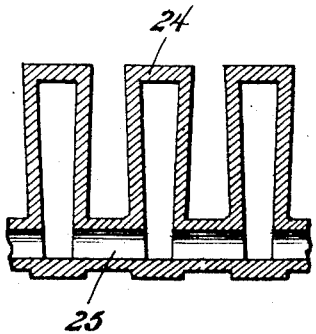
Fig. 5 is a fragmentary sectional view taken on the line 5—5 of Fig. 1.

Referring particularly to the drawings and to the embodiment of the invention selected for illustrative purposes, there is shown a water heated comprising a series of side water walls connected to a water fire box having a water grate, each of the side water walls being connected to a dome or cover portion adapted to supply hot water vapor or steam to a heating system as is customary.

In accordance with this invention there is shown a base portion 20 conveniently cast in several sections and adapted to support the furnace and provide the usual ashpit below the furnace grate. Herein the base has the usual ash-removing door 21 and a stoking door 22.

Supported upon the base by suitable means is a water fire box section 23 adapted to be cast in one piece and having an integral water grate 24 at the bottom. Herein the inside of the fire box is tapered inwardly and downwardly and is substantially rectangular in cross section. The water grate 24 is shown as comprising a series of conduits extending from the bottom of the front wall of the fire box to the bottom of the rear wall, each being arched downwardly and all of them being connected to a common transverse cleanout conduit 25 extending at one end through the side of the base portion. To strengthen the fire box casting, there is shown a horizontal web 26 between the top and the bottom and a return pipe 27 from the heating system is shown as being connected to the water space of the fire box below the web. The front wall of the fire box, above the web 26 is shown as having an opening which registers with the stoking door opening in the base.

To facilitate connecting the water walls to the water fire box, there is shown a series of openings at the upper edge thereof. Herein, a series of conduits formed by coring the casting are provided at the four corners to be connected to the front and rear water walls and a pair of opposed openings are provided in the side walls of the fire box to be connected to the side water walls. Each of the circulating openings may be and preferably is in the form of a cylindrical conduit 28 having a boss 29 projecting above the upper edge of the fire box and having a seat 30 adapted to receive a nipple on one of the sections later to be described (see Fig. 13).

Referring to Fig. 1 the side walls of the heater are shown as being substantially rectangular hollow castings, each adapted to be connected to the top of one side wall of the water fire box. Herein, the front and rear walls are each connected to the corner openings in the fire box, presenting nipples 31 adapted to be received in the counterbores or bosses 29 and to rest upon gaskets 32 to make water-tight connections. The front water wall designated by the numeral 33 is shown as having a plurality of clean-out openings 34 closed by clean-out doors 35. This water wall is shown as having a plurality of water baffles 36 projecting toward the rear water wall and in each of the baffles which is made in the form of a flat conduit connected to the inside of the water wall being divided by a horizontal partition 37 extending from the front of the water wall so that the water rising in the water wall is constrained to flow around the partition or baffles and be heated by the hot gases passing up through the furnace.

The rear water wall designated by the reference numeral 38 is shown as having a plurality of water baffles similar to those shown on the front water wall but staggered with respect to them to produce a tortuous or serpentine gas passage.

Each of the side water walls designated by the reference numeral 39 is shown as being suitably shaped to close the space between the front and rear water walls. Referring to Figs. 1 and 11, it will be noted that the conduits leading to the circulating nipple connection extend inwardly from the front and rear water walls making it necessary to taper the side walls adjacent to their lower ends. The same applies to the upper ends of the water walls because of the nipples later to be described.

To provide a cover plate and a common dome for all of the water walls, there is shown a hollow dome 40 connected to each of them by a circulating connection similar to those described in connection with the water grate and the lower ends of the water walls. This provides a space to receive the hot water and deliver it to the heating system through a delivery pipe 41, assuming that the system employs hot water. However, if the system employs steam, the steam will be liberated in the dome portion 40 and delivered through the pipe 41 in the same manner.

To provide a convenient smoke outlet, there is shown an elbow 42 integral with the dome portion 40 and preferably being cast with it. Herein the elbow is shown as having one branch projecting horizontally from the rear edge of the dome portion.

Heretofore, considerable difficulty has been experienced in preparing machined nipples and other parts for the water walls of sectional boilers of this general character because of the great number of connections necessary to be made. In the present construction the fittings are made water-tight by means of a series of tie rods or bolts, thus obviating the necessity for special fitting.

Referring to Figs. 1 to 4 inclusive, the upper edge of the fire box at the four corners is shown as having integral lugs 43 projecting laterally through suitable slots in the skirt of the base and incidentally serving as supports for the fire box. Likewise, the dome portion at the four corners is provided with perforated lugs 44 adapted to receive tie rods 45 which, when tightened, will tighten all of the fittings or nipples in their seats.

In Fig. 9 there is shown a slight modification of the dome portion of the heater. In this instance the dome 40ᵃ is similar to the dome described in connection with Fig. 1 except that it is provided with a steam or vapor enlargement 46 to which the service pipe is adapted to be connected.

From the foregoing description it will be seen that this invention provides a sectional domestic heater which can be made of relatively few castings and which can be easily assembled. Moreover, the construction is such that a maximum amount of heat is absorbed by the water circulating through the heater, thereby economizing with coal or other fuels which may be used. Further, it is adapted to use modern types of burners or coal as desired.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:

1. A water heating furnace comprising, in combination, a water fire box; a water grate consisting of a plurality of conduits integral with said fire box section; a clean-out conduit communicating with each of the lowermost portions of each of the water grate conduits; a plurality of water walls communicating with said fire box section; a cover for said water wall sections and means for securing said sections together.

2. In a water heating furnace of the character described, a water fire box having provision to rest on a base; a water grate in the bottom of said fire box including a plurality of conduits integral with the lower part of said fire box; and a clean-out conduit communicating with each of said water grate conduits at the lowermost parts thereof.

3. A water heater of the class described, comprising, in combination, a substantially rectangular base having an ash pit; a rectangular water fire-box section supported on the base and having water grate conduits cast integral therewith; separate front, rear and side water walls supported on the fire-box section communicating directly with the water space in said section through a plurality of separated openings; water baffles cast integral with the front and rear water walls and having partitions therein, said baffles on one wall being staggered with the baffles on the other wall to provide a zigzag gas pass; a horizontal dome section connected to said water walls and having an outlet flue therein; and means to secure all of said sections together.

4. A water heater of the class described comprising, in combination, a base having a stoking opening; a substantially rectangular fire-box within the base and having a stoking opening registering with the stoking opening in the base; a water grate cast integral with the fire-box; front, rear and side water walls mounted on the water fire-box and communicating therewith near the four corners and at opposite sides; staggered water baffles on opposite walls extending horizontally within the gas passage to provide a tortuous flue; one of said water walls having cleanout openings opposite the ends of the water baffles in the opposite walls; a dome on and communicating with the water walls; and tie rods connecting the dome to the fire-box section to hold all of the sections assembled.

In testimony, that I claim the foregoing as my own, I have hereto affixed my signature.

HENRY J. LANGE.